United States Patent Office 3,374,252
Patented Mar. 19, 1968

3,374,252
PHARMACEUTICAL PRODUCT OBTAINED FROM PLANTS OF THE GENUS HOLARRHENA (APOCYNACEAE)
Jean Louis Paul Mainil, Boitsfort, Belgium, assignor to Société Anonyme Oletta, Luxembourg, Luxembourg
No Drawing. Continuation-in-part of application Ser. No. 8,486, Feb. 15, 1960. This application Oct. 17, 1962, Ser. No. 231,292
Claims priority, application Luxembourg, Aug. 19, 1958, Patent No. 36,360; application Germany Dec. 31, 1959, S 66,498
1 Claim. (Cl. 260—397.3)

ABSTRACT OF THE DISCLOSURE

An alkaloid derived from plants of the genus Holarrhena (Apocynaceae) and of the formula:

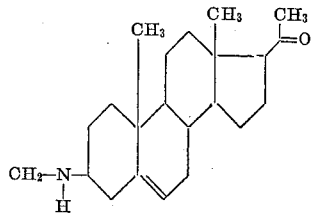

This application is a continuation-in-part of my earlier application 8,486 filed Feb. 15, 1960 now U.S. Patent No. 3,244,696.

This invention relates to pharmaceutical products obtained from the leaves of plants of the genus Holarrhena (Apocynaceae) and more particularly of the species *H. africana* and *H. floribunda*.

Investigations carried out have made it possible to ascertain that a new compound which is found in combined form in the leaves and inflorescences of the plants is different from the compound found in the cortices of their stems or roots referred to in prior literature.

The possibility of using such raw material enables the same trees to be exploited indefinitely whereas the use of trunk bark or root cortices almost always causes the loss of the tree.

The present invention relates to an alkaloid adapted to be used to treat rheumatism and asthma characterized by the molecular formula $C_{22}H_{35}ON$ and of the structural formula.

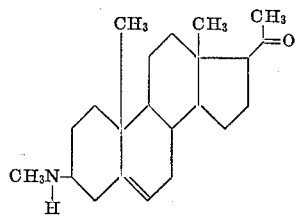

(3β-methylamino-20-oxopregnane-5-ene or Holaphylline).

The melting point of the base is 128° C. and the M.P. of the hydrochloride is 251° C.

The compound also has an $(\alpha)_D$ of the hydrochloride of +34° (methanol C=1%).

The infra-red spectrum shows a C=0 band at 5.95 and an NH band in the region of 3.

This compound has an anti-inflammatory action of the intensity of cortisone. It has no hormonal action. It is particularly advantageous for treating rheumatism and asthma. It may be used in the form of tablets of 25 and 50 mg. The daily initial doses are of 250 to 500 mg. and are later on reduced to one-half.

The process of obtaining the compound takes into consideration that a number of alkaloids are, on the one hand, combined with one another and with chlorophyl or other derivatives and on the other hand, also with tannoids or triterpenes, particularly the ursolic acid.

An alkaloid according to the invention is obtained by submitting the crushed leaves of plants of the genus *Holarrhena* (Apocynaceae) and more particularly of the species *africana* and *floribunda* to an extracting process during which the chlorophyll, the rubbers and the triterpenic acids and tannoids and particularly the ursolic acid are separated so as to obtain a residue which contains the basic principles and the alkaloids; this residue is then submitted to chromatography so as to successively separate the different compounds.

According to one embodiment of the process, the crushed or broken leaves are extracted in, for example, a percolator, an apparatus of the Soxhlet type or a rotary extractor, with an acidified alcohol, such as methanol containing 2% acetic acid, the resulting solution is evaporated, water is then added, and the solution then left standing.

The invention is further illustrated by the following example:

By way of example, 1000 g. of crushed leaves of *Holarrhena africana* are percolated with 7000 cc. of methanol containing 2% acetic acid.

The resulting solution is then evaporated in vacuo until its volume is reduced to 1000 cc.

Water and alcohol are then added to obtain a methanol containing acetic acid which has an alcohol content of 60°. This is left standing for 12 hours.

Filtration is then carried out, during which the coagulate comprising the chlorophyll, the rubbers and the triterpenes and especially substances of decomposition of the tannoids is separated. This insoluble material is constituted of a substance which does not react with mercuric iodide but does react well in the Liebermann reaction; after purification, its melting point is 245° C.

The filtrate is then made alkaline with ammonia and extracted with a solvent such as, for example, methylene chloride. The quantity of methylene chloride is 750 cc. The extract comprising the solvent and the alkaloid bases is evaporated.

The bases freed from solvent, that is to say, methylene chloride in the case in question, are agitated with a solvent such as, for example, petroleum ether. They thus pass into the solvent, which leaves a mass of residues, this being then purified in the form of oxalate.

The petroleum ether is evaporated and the bases are redissolved in benzene or another suitable solvent; the latter is introduced into a chromatographic column of, for example, alumina, silica or an ion exchanger; eluants separate the adsorbed principles successively.

Elution with a benzene ether mixture releases an alkaloid with a steroid structure (holaphylline) which crystallises from methanol. The characteristics thereof are:

empirical formula $C_{22}H_{35}ON$
M.P. of the base is 128° C.
M.P. of the hydrochloride is 251° C.
$(\alpha)_D$ of the hydrochloride is +34° (methanol: C=1%).

The infra-red spectrum shows a C=0 band at 5.95 and an NH band in the region of 3.

The substance is 3-β-methylamino-20-oxopregnane-5-ene and its structural formula is

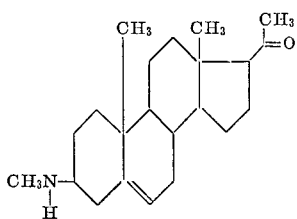

This alkaloid has no action on the gonads. It stimulates the surrenal glands; it has an anti-inflammatory action of the same intensity as cortisone. It synergizes cortisone from the point of view of anti-inflammatory and of glycogenopexic action.

The acute toxicity LD relative to intravenous introduction into mice is 30 mg./kg.

What is claimed is:

1. 3-β-methylamino-20-oxo-pregnane-5-ene of the structural formula:

having the following characteristics:
empirical formula: $C_{22}H_{35}ON$;
M.P. of base 128° C.;
M.P. of hydrochloride 251° C.;
$\alpha_D$ of the hydrochloride +34° (methanol C=1%);
an infra-red spectrum showing a C=0 band at 5.95 and an NH band in the region of 3.

References Cited
UNITED STATES PATENTS
3,244,696   4/1966   Mainil.

OTHER REFERENCES
Janot et al.: Chem. Abst., vol. 54, 1960, pp. 6774(g)–6775(b).
Janot et al.: Bull. Soc. Chem., France, June 1959, pp. 896–900.

LEWIS GOTTS, *Primary Examiner.*

M. LIEBMAN, ELBERT L. ROBERTS, *Examiners.*

J. R. BROWN, *Assistant Examiner.*